Dec. 29, 1936.  G. H. KEHR ET AL  2,065,529
ADJUSTABLE SUPPORT
Filed Feb. 27, 1936  2 Sheets-Sheet 1

INVENTOR
Gustav H. Kehr
Fred J. Ertel
Austin & Dix
ATTORNEYS

Dec. 29, 1936. G. H. KEHR ET AL 2,065,529
ADJUSTABLE SUPPORT
Filed Feb. 27, 1936  2 Sheets-Sheet 2
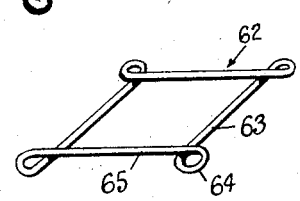
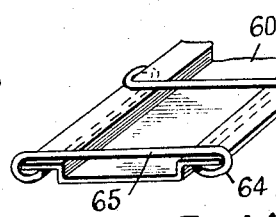
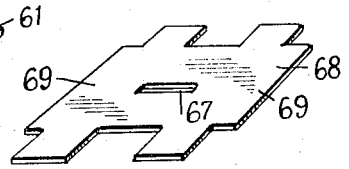
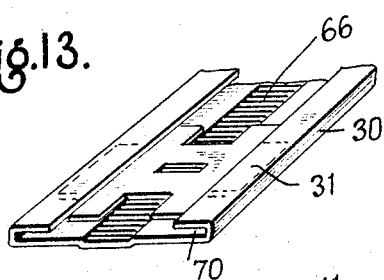
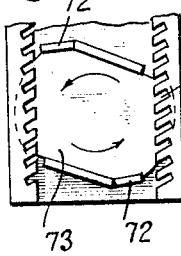
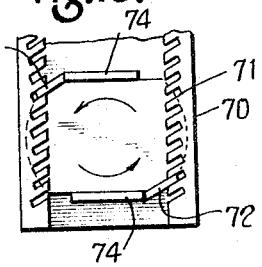
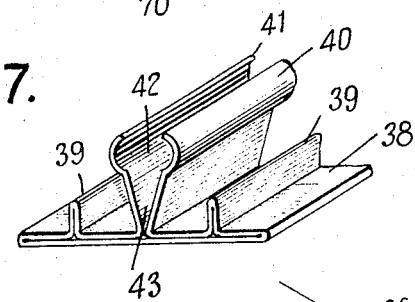
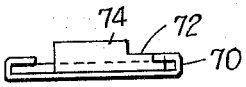
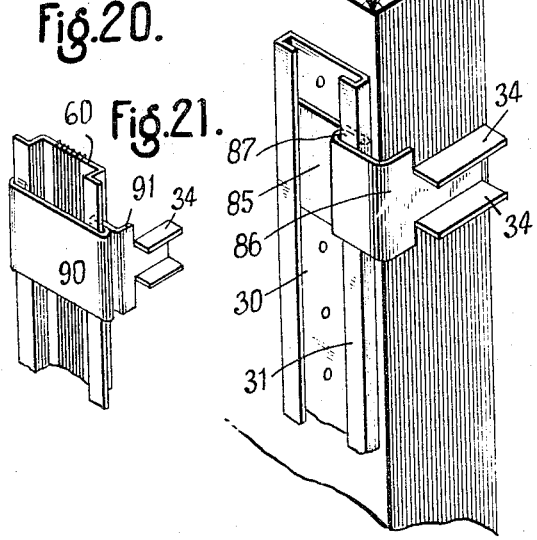
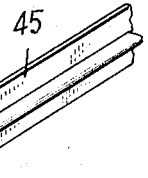
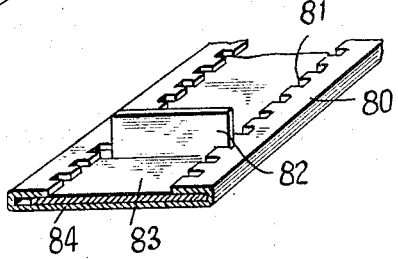
INVENTOR
Gustav H. Kehr
Fred J. Ertel
Austin + Dry
ATTORNEYS Patented Dec. 29, 1936

2,065,529

UNITED STATES PATENT OFFICE 2,065,529

ADJUSTABLE SUPPORT

Gustav H. Kehr and Fred J. Ertel,
Brooklyn, N. Y.

Application February 27, 1936, Serial No. 66,098

10 Claims. (Cl. 72—19)

This invention relates to improved devices for supporting wall-surfacing material, tile, concrete or stucco block, shelving or other members to be supported, and more particularly to such devices which are extremely flexible for supporting various sizes of members spaced at different intervals and in parallel rows, the devices being at the same time particularly simple and inexpensive to manufacture, and easy to assemble and use.

A vast number of proposals have been made with these general objects in view, but most, if not all of them, have involved certain disadvantages for one reason or another. While the nature of the problem does not permit a detailed review of these disadvantages, it may be noted, by way of example, that when tiles are mounted in parallel rows to surface a wall the variations in the widths of the tiles make it difficult to assemble them with the present supporting members which are made to be spaced apart at fixed intervals. Moreover, many proposals have involved difficulties in assembling the supporting members and the tiles, while other proposals have been complicated and expensive to make.

A feature of the present invention accordingly resides in the provision of an improved construction of the character indicated which avoids these disadvantages and which enables tiles, shelving and the like to be supported at various intervals which can be determined during the progress of the work of assembling the units.

A relatively specific feature of the present invention resides in the provision of a device for supporting tiles, shelving or the like, the construction including a plurality of spaced tracks which can be secured to a frame in convenient manner, a plurality of slides which cooperate with the tracks and which can be located at any desired points along the tracks, and parallel stringers which can be readily engaged with the slides for carrying the members to be supported in the desired relation to one another.

Still another feature of the invention lies in the provision of a plurality of tracks and slides carried by the tracks, these slides and tracks being constructed and arranged so that cooperating portions of them serve to hold the slides in any desired position which can be determined by the workmen assembling the construction at the site where the structure is erected, so that the devices may be used in a wide range of different situations. In this way, the number of different types of device carried in stock may be reduced to a minimum, and the construction will, at the same time, be exceptionally flexible for different needs.

Other features, objects and advantages of the present construction will in part be pointed out and in part become apparent as the description of certain forms illustrating the invention proceeds, reference being had to the accompanying drawings, wherein:

Figs. 10 and 11 show other forms of track and slide;

Figs. 12 and 13 show further modifications of track and slide;

Figs. 14 and 15 are plan views of another form of track and slide;

Fig. 16 is an end view of Fig. 15;

Figs. 17 and 18 show two forms of stringer in perspective;

Fig. 19 is a perspective view of a still further form of track and slide; and

Figs. 20 and 21 are perspective views illustrating further modifications of the construction shown in Fig. 1.

Figure 1:
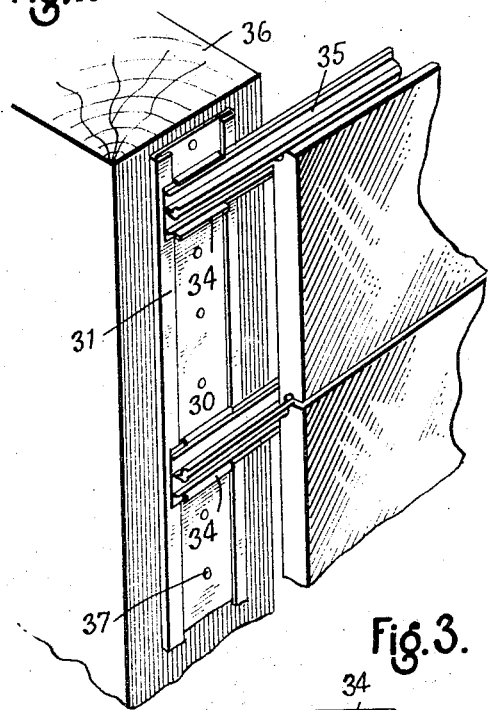
Fig. 1 is a perspective view of one form of construction in accordance with the invention, partly broken away.
Figure 3:
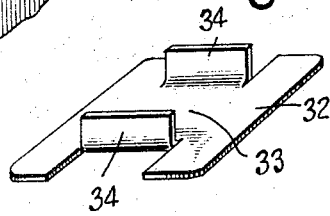
Fig. 3 is a perspective view of the form of slide shown in Figs. 1 and 2.

Referring first to Figs. 1 and 3, there is shown a construction comprising a track 30 having bent-over flanges 31 along opposite sides thereof to form a panel which receives between the flanges and the back track the edge portions 32 of a slide 33. This slide advantageously comprises a pair of bent-up flanges 34 which lie between the flanges 31 of the track, and which are adapted to receive snugly between them a stringer 35. The track 30 may be secured to a supporting frame member such as uprights 36, in any convenient manner, for instance, through nails 37, which may be simply driven through the central part of the track at required intervals. The stringers 35 may take various forms, depending upon the form of the members which are to be supported by the device, but one particularly advantageous type of stringer for supporting tiles is best illustrated in Fig. 17, comprising a rear portion 38 which is adapted to lie between the flanges or cleats 34, a pair of outstanding flanges 39 for engaging corresponding flanges formed in tiles or the like, and opposed central flanges 40 having an opening 41 between them which is narrow at the outside, widens out as indicated at 42, and then tapers to a narrow section adjacent the back of the stringer 38, as indicated at 43. This construction of the stringer is effective when plaster or concrete is to be filled in between the tiles to make a tight joint since the flanges 40 form a good lock with the plaster or the like, while the flanges 39 engage the tiles at other points. In the form shown in Fig. 17, the entire stringer may be made out of a single piece of metal, or the like, bent over upon itself, for instance, as illustrated, to form the various flanges. If desired, the two uprights carrying flanges 40 and 41 may be substantially vertical and the flanges 40 and 41 brought closer together and are sprung by the tiles.

The tracks and slides are preferably made of metal which is somewhat springy or resilient, so that the side portions 32 of the slides are engaged by the flanges 31 of the tracks, so that the slides will be retained in any given position in which they are placed, during the assembly of the construction. As shown particularly in Figs. 4 and 5, the slides may be so constructed that they have a certain bulge which assists the foregoing action, or so that the edges of the slides form a wedge with the channels in the track. For certain types of stringers, one of the bent-up flanges 34 may be omitted, and the stringers may simply rest on the lower flange 34, or otherwise engage a single flange instead of being received between opposed flanges.

Figure 2:
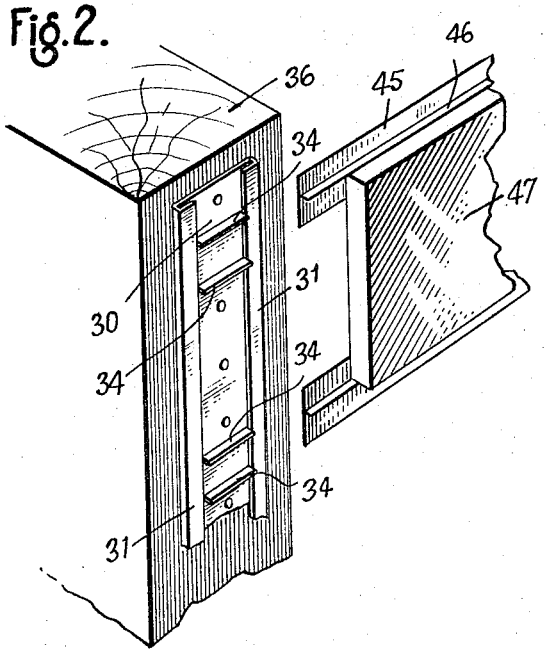
Fig. 2 is a similar view of a somewhat modified form of construction.

In Fig. 2, there is shown a modified form of stringer 45, which has a single outstanding flange 46, the tiles 47 or other members to be mounted being simply placed snugly between these flanges on a pair of spaced parallel stringers. It will be appreciated that this type of stringer is feasible where the slides can be adjusted exactly to the proper spacing so that a row of tiles of given width may be employed, while the next row may be assembled to form tiles having a different width.

Figure 6:
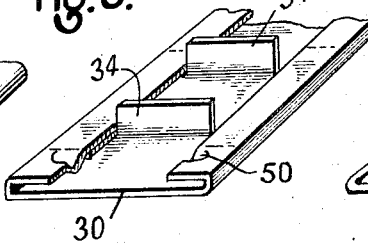

With reference to Fig. 6, there is shown a particularly simple and effective manner of locking the slides in desired position, and retaining them there. In this form of construction the desired number of slides may be simply assembled with the track and as the workman proceeds to set the slides, beginning at the bottom, he may punch or deform the flanges 31 of the track as indicated at 50, just below each slide. After the stringer has been assembled with this slide, and a corresponding slide carried with the next parallel track, the slide next above may be similarly locked. In other words, it is a simple matter to assemble a series of tracks with a frame or wall, then lock the first or lower set of slides and the stringer carried by them, and then proceed to repeat these operations at the desired height for the next stringer. The flanges of the track may therefore be made of any suitable metal which can be deformed by hammering it inwardly as indicated. No special tools are required for the operation and when the slides are held by the track against movement because of their own weight, it will be appreciated that the assembly is particularly simplified since the workman can set the slides at the desired points, and then hammer in the flanges 31 to form the lugs 50, which will prevent the slides from moving down when additional weight is placed upon them. It will also be appreciated that this type of construction may be employed with any of the track and slide members, whenever the flanges of the track are thus constructed to permit the punching out of lugs.

Figure 7:
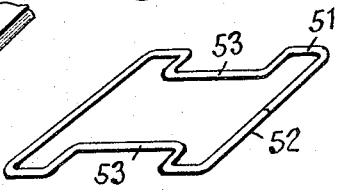
Fig. 7 is a perspective view of another form of slide.
Figure 8:
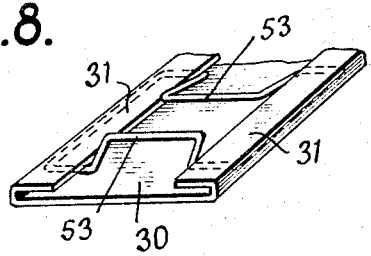
Fig. 8 is a perspective view of the slide shown in Fig. 7 assembled with a track and ready for use.

As shown in Figs. 7 and 8, the slide may, in one form, comprise a preformed member 51 made of stiff wire or the like, with side portions 52 adapted to seat in the channels in the track 30, and with central portions 53 adapted to be bent-up as shown in Fig. 8, between the flanges 31 of the track. A stringer such as that shown at 35 may then have its portion 38 inserted between the portions 53 of the slide, so that it is held between them. Here, too, one of the portions 53 may be dispensed with, and the final position of the slide may be determined by punching out lugs 50, as previously described.

Figure 9:
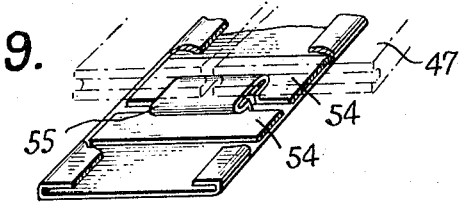
Fig. 9 shows a further modification of track and slide construction.

Referring now to Fig. 9, there is shown a somewhat modified form of slide comprising portions 54 adapted to ride in the track as described above, and a forwardly extending T-shaped portion 55 which may serve to hold tiles 47 directly, or which may serve to support a stringer. For this purpose, the top of the T portion 55 preferably stands up above the portions 54 so that the tiles having grooves in their edges may engage the portion 55 as illustrated. The portion 55 may extend out beyond the sides of the slide to any desired extent. When this form of construction is employed a series of tracks may be used, close enough together so that the tiles or the like span the space between the slides and rest at opposite ends upon a pair of adjacent slides. This form of construction is particularly advantageous for relatively large tiles which have sufficient strength so that they do not require stringers. Here again, suitable lugs may be formed to engage the slides as described, and thus hold them in fixed position while the plaster or the like is filled in between the edges of the tiles. However, where the outstanding portions of the slides, and the grooves in the tiles are so related that the edges of the tiles abut together, so that the tiles support one another directly, the lugs may be dispensed with.

Referring to Figs. 10 and 11, there is shown a construction in which the track and slide have their cooperating parts substantially reversed with respect to the form shown in Figs. 7 and 8. In the latter figures, the track 60 is provided with outstanding flanges 61, raised above the bottom of the track, and the slide 62 is formed in some convenient manner to cooperate with the track in the fashion described. The slide 62 may, for instance, be formed of suitably stiff wire, from a single piece, with portion 63 adapted to lie beneath the flanges 61, looped corner portions 64, and transversely extending portions 65 which are adapted to receive and support a stringer between them. The wire may be formed, in known manner, so that when the slide is placed on the track, the portions 63 press resiliently against the bottoms of the flanges 61, while the portion 65 bears against the front faces of the flanges.

Figure 4:
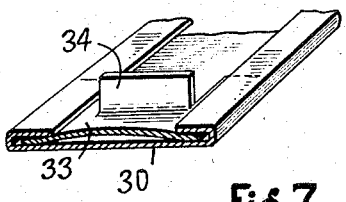
Figs. 4, 5 and 6 are perspective views of modified forms of track and slide constructions.
Figure 5:
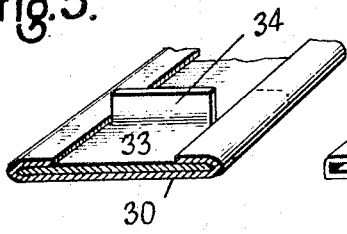

In the form shown in Figs. 12 and 13, the track 30 is similar to that shown in Figs. 4, 6 and 8, but the central portion of the track is provided with ratchet teeth 66, for engagement with teeth 67 punched out of the center of a slide 68. This slide cooperates with the track through side flanges 69 which slide in the channels 70, the flanges 31 of the track being sufficiently resilient to permit tooth 67 to slide over ratchet teeth 66 in one direction, and engage said teeth when weight is put on the slide.

In Figs. 14, 15 and 16 there is shown still another type of slide and track, in which the track 70 has grooves 71 formed in opposite flanges for engaging teeth 72 carried on slides 73. When the slide is in the position shown in Fig. 14, the slide may be moved up and down, and when the slide is turned into the position shown in Fig. 15, the teeth 72 slip into the inclined slots 71. The tops of the teeth 72 preferably lie flush with the tops of the flanges, or therebelow. Additional flanges 74 are also preferably formed on the slides, extending outwardly beyond the tops of the teeth, for supporting stringers in the manner described in connection with Fig. 3.

Fig. 19 shows a modified form of track and slide in which the track 80 has opposed grooves 81 for receiving one edge of an upstanding flange 82 secured to a slide 83. The base of the slide 84 is narrower than the track, and the flange 82 is narrower than the distance between opposite teeth 81. Thus, the slide may be moved to a given position along the track, and then moved across the track until the flange 82 is engaged between a pair of adjacent teeth. The flange 82 may serve to support a stringer in the manner described in connection with Fig. 5.

Referring to Fig. 18, there is shown another form of metal stringer which is somewhat similar to the form shown in Fig. 17, but which may consist of a base 75, a pair of upright flanges 76 and central flanges 77 forming a V-shaped groove therebetween. This form of stringer is employed in the same way as the form shown in Fig. 17.

Referring now to Figs. 20 and 21, there is shown a construction which is adapted for use at the ends of the stringers, or which may be employed where there is room to mount the tracks on the sides of frame members 36. Through this construction, the stringers may be mounted substantially flush against the front faces of frame members, thus resulting in a superior arrangement for many purposes. In Fig. 20, the track 30 is similar to that shown in Fig. 1, while the slide 85 may comprise a portion adapted to ride in the track, and an angle portion 86 secured to the slide or formed integral therewith, and adapted to extend around the corners of the frame member. The portion 86 may have outstanding flanges 34 formed thereon for receiving a stringer 45, in the manner already described. If desired, where the slide is doubled over as shown at 87, the flange 31 may engage the doubled over portion frictionally, while the opposite flange may or may not be arranged to engage the other side of the slide. Thus, the same track may be used for both the present type of slide and for other slides such as the one shown in Fig. 3.

With reference to Fig. 21, there is shown a track 60, like the one in Fig. 11, for cooperation with a slide 90 which has a right angle portion 91 provided with flanges 34. This slide 90 functions similarly to the slide described in connection with Fig. 20.

In some instances, it may be desirable that the tracks shall have relatively considerably more strength so that they will not bend over and snap during shipment or while being affixed to the wall. In the latter instance where the strip is cut to reach a high ceiling it is liable to bend outward from the top while being positioned and place a permanent or semi-permanent bend in it. This is undesirable as it may interfere with the free movement and adjustment of the slide. This added strength may be gained in several ways. In one instance the track may be made of heavier material. In another instance, there may be one or more offsets in the track as illustrated in Fig. 13. These offsets or teeth are horizontal and serve the two purposes of teeth to engage the slide and for gaining strength. In another instance as shown in Fig. 21 the offsets, corrugations or heads, whichever they may be termed, may be vertical so as to give the added strength to the track.

It will thus be appreciated that there is provided a simple and flexible construction including a track which may be mounted on a frame member, and a slide which cooperates with the track, and which may be moved to any desired position and be frictionally held there, while it is secured in position, for instance, through forming lugs in the track, or otherwise. The track and slide construction enables the workman to mount the tracks at any desired, spaced intervals, and subsequently locate the slides at the proper vertical spacing. Thereafter, the stringers may be readily engaged with the slides, and will be held in given position, for cooperating with tiles, shelving, or other members to be supported.

The terms and expressions which have been employed are used for purposes of description and not of limitation, and there is no intention, in the use of such terms and expressions, of excluding any of the features shown and described, or portions thereof, but it is recognized that various modifications are possible within the scope of the invention claimed.

We claim:

1. In a construction of the character described, a track adapted to be secured to a fixed element, a slide adapted to cooperate with the track and having a portion outstanding beyond the track and carried by the track for engaging the slide in any one of a plurality of positions.

2. In a construction of the character described, a track adapted to be secured to a fixed element, a slide adapted to cooperate with the track and having a portion outstanding beyond the track, and means carried by the track for engaging the slide in any one of a plurality of positions, said track having a flange formed of soft metal adapted to have a lug punched therein.

3. In a construction of the character described, a metal track having opposite flanges forming channels between the flanges and the back of the track, a slide having portions adapted to frictionally slide in said channels, portions carried by said slide and extending outwardly beyond the track, and stringers adapted to be engaged by the last-named portions of the slides.

4. In a construction of the character described, a slide comprising a pair of opposed flanges forming channels at opposite edges of the slide, a plurality of grooves formed in at least one of said flanges, a slide having portions adapted to move in said channels, and portions adapted to engage said grooves, and means carried by said slide for supporting a stringer member.

5. In a construction of the character described, a track, opposed flanges formed with said track and extending outwardly from points above the bottom of the track, a slide having bent-over portions adapted to engage the rear sides of said flanges, and a projection carried by said slide adapted to support a stringer.

6. In a construction of the character described, a track having flanges adapted to be frictionally engaged by a slide, a slide having portions adapted to cooperate with said flanges, and portions formed on said slide and adapted to extend outwardly therefrom for holding a stringer between said portions.

7. In a construction of the character described, a track having a pair of opposed flanges, a slide having portions adapted to resiliently engage said flanges, a pair of opposed portions carried with said slide and lying in a plane parallel to and in front of said track, and a stringer member adapted to seat between said opposed portions of said slide, said stringers being adapted to be similarly supported at a spaced point, and having flanges formed thereon for engaging a member to be supported by the stringer.

8. In a construction of the character described, a track having a flange, a slide having a portion adapted to be frictionally engaged by said flange, and a portion lying at right angles to the portion engaged by the flange, and an outstanding portion adapted to engage a stringer and extending horizontally outward from the portion which is at right angles to the first-named portion.

9. In a construction of the character described, a track having flanges lying above the bottom of the track, a slide having portions adapted to engage said flanges for holding the slide in predetermined position, and another portion carried by said slide and extending forwardly of said flanges, for engaging a stringer.

10. The construction as claimed in claim 9, wherein the last-named portion of the slide comprises a pair of opposed flanges extending transversely to the length of the slide, and wherein a stringer is carried with said flanges between the same.

GUSTAV H. KEHR.
FRED J. ERTEL.